United States Patent [19]
Balsells

[11] Patent Number: 5,139,276
[45] Date of Patent: Aug. 18, 1992

[54] CANTED COIL SPRING RADIALLY LOADED WHILE IN A CAVITY

[75] Inventor: Peter J. Balsells, P.O. Box 15092, Santa Ana, Calif. 92705

[73] Assignees: Peter J. Balsells; Joan C. Balsells, both of Santa Ana, Calif.

[21] Appl. No.: 620,732

[22] Filed: Dec. 3, 1990

Related U.S. Application Data

[63] Continuation-in-part of Ser. No. 463,480, Jan. 11, 1990, abandoned, which is a continuation-in-part of Ser. No. 348,419, May 8, 1989, Pat. No. 4,974,821, which is a continuation-in-part of Ser. No. 186,017, Apr. 25, 1988, Pat. No. 4,830,344.

[51] Int. Cl.$^5$ .................................................. F16J 1/34
[52] U.S. Cl. ...................................... 277/163; 277/164; 267/1.5
[58] Field of Search ............... 277/163, 164, 235 R, 277/158, 205; 267/1.5, 166, 166.1, 167, 168

[56] References Cited

U.S. PATENT DOCUMENTS

| | | | |
|---|---|---|---|
| 3,087,038 | 4/1963 | Bethke | 267/167 |
| 3,183,010 | 5/1965 | Bram | 277/235 |
| 3,323,785 | 6/1967 | Mather | 267/167 |
| 3,468,527 | 9/1969 | Mather | 277/235 |
| 4,655,462 | 4/1987 | Balsells | 267/167 X |
| 4,678,210 | 7/1987 | Balsells | 285/318 |
| 4,804,290 | 2/1989 | Balsells | 285/164 X |
| 4,805,943 | 2/1989 | Balsells | 285/305 X |
| 4,826,144 | 5/1989 | Balsells | 267/167 |
| 4,830,344 | 5/1989 | Balsells | 267/167 |
| 4,893,795 | 1/1990 | Balsells | 267/1.5 |
| 4,915,366 | 4/1990 | Balsells | 267/167 |

Primary Examiner—William A. Cuchlinski, Jr.
Assistant Examiner—Daniel DePumpo
Attorney, Agent, or Firm—Walter A. Hackler

[57] ABSTRACT

A canted coil spring assembly includes a plurality of coils having major and minor axes and canted along a center line defined by an intersection of the major and minor axes. The coils are interconnected in a manner forming a radial gartertype canted coil spring and structure are provided for non-invasively supporting the plurality of coils in an orientation suitable for radial loading of the radial garter-type canted coil spring and for controlling the resilient characteristics of the radial garter-type canted coil spring.

10 Claims, 3 Drawing Sheets

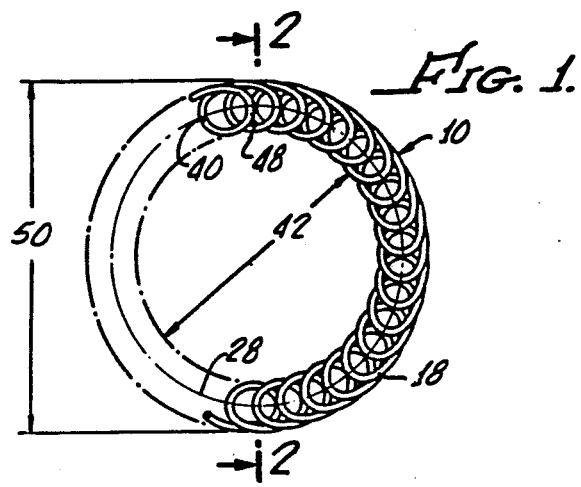
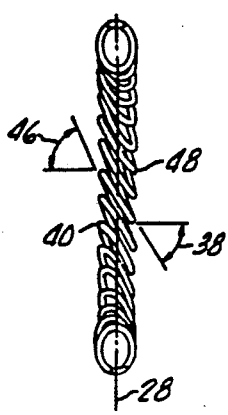
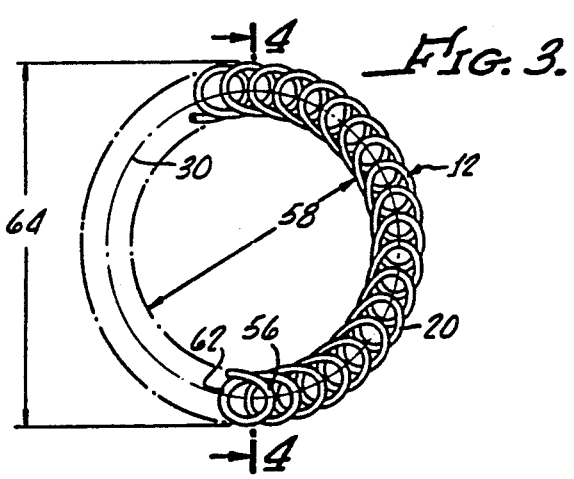
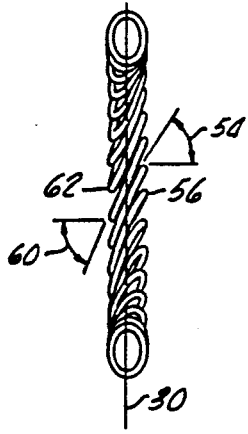
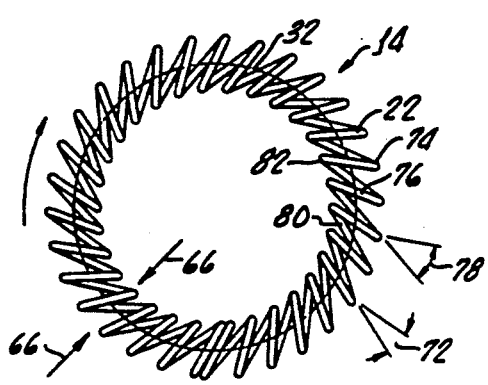
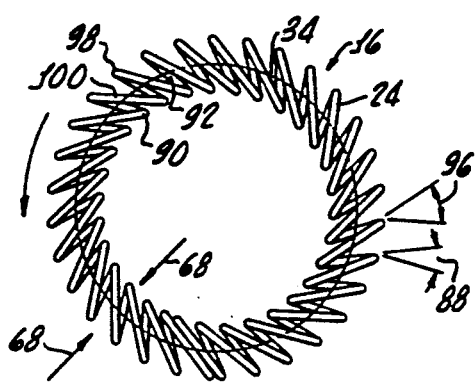

RADIAL SPRING COMPRESSED AXIALLY TURNED ANGLE 90°

AXIAL SPRING TURNED 30° COUNTERCLOCKWISE

AXIAL FLAT SPRING

AXIAL SPRING TURNED 30° CLOCKWISE

AXIAL SPRING TURNED 60° CLOCKWISE

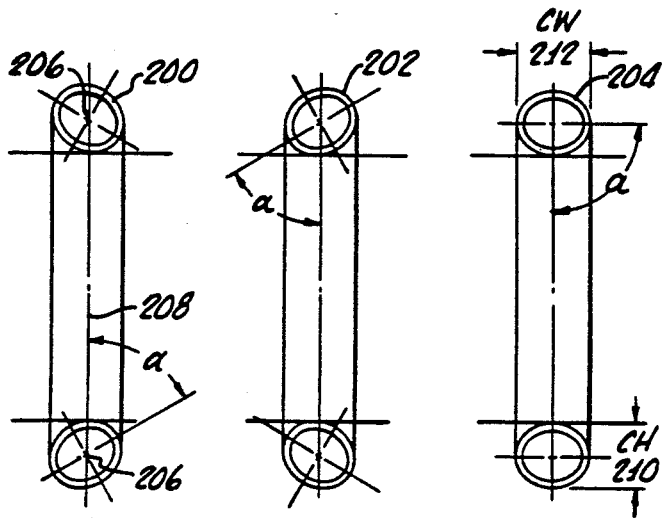
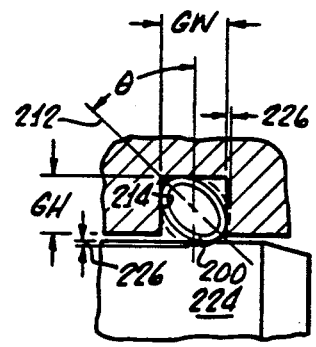
Fig. 10a. Fig. 10b. Fig. 10c.
Fig. 11a.
Fig. 11b.
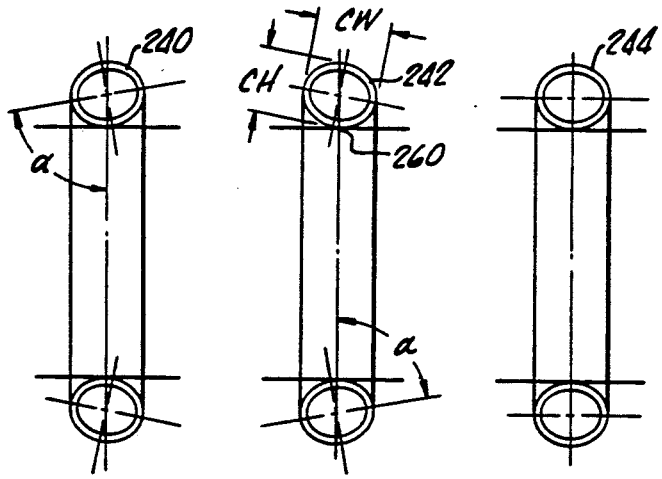
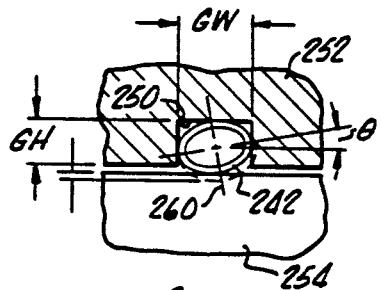
Fig. 12a. Fig. 12b. Fig. 12c.
Fig. 13a.
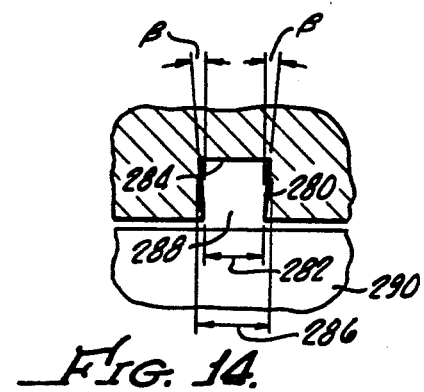
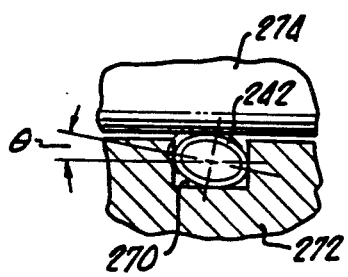
Fig. 14.
Fig. 13b.

CANTED COIL SPRING RADIALLY LOADED WHILE IN A CAVITY

The present application is a continuation-in-part of U.S. patent application Ser. No. 463,480, filed Jan. 11, 1990, now abandoned, which is a continuation-in-part of U.S. patent application Ser. No. 348,419, filed May 8, 1989 now U.S. Pat. No. 4,974,821, which is a continuation-in-part of U.S. patent application Ser. No. 186,017, filed Apr. 25, 1988, now U.S. Pat. No. 4,830,344. U.S. Pat. No. 4,974,821 and U.S. Pat. No. 4,830,344 are to be totally incorporated, including drawings, in the present application by this specific reference thereto.

The present invention generally relates to canted-coil springs and seals and, more particularly, relates to canted-coil springs retained in a groove with interference between the spring coils and the groove to retain the spring in a selected orientation for subsequent loading of the spring. Orienting the spring for major or minor axis loading enables a specific selected resilient, or load-deflection, characteristic, in response to the subsequent loading of the springs.

Of specific importance, the present invention concerns garter-type spring assemblies best suited for radial loading of the spring.

The force-deflection characteristics of heretofore available garter-type axially loaded springs have been varied by changing numerous spring parameters, including the wire size, the coil height, the coil spacing, and the front angle, which defines a leading portion of each canted spring coil. While these parameters can be used effectively to tailor the load-deflection characteristics of the spring, they do not either dominate or enable the spring to achieve its total design potential. This was taught in U.S. Pat. Nos. 4,826,144 and 4,915,366 to Balsells.

These references disclose coils which are interconnected in a manner forming a garter-type resilient coil spring, with the trailing portion along an outside diameter of the garter-type axially resilient coil spring and the leading portion along an inside diameter of the garter-type axially resilient coil spring and vice versa.

The selected disposition of the back angle and trailing portions defined thereby provides for the capability of tailoring a garter-type axially resilient coil spring beyond the range of conventional garter-type resilient coil springs heretofore known.

As a consequence, springs may be formulated with higher load-deflection characteristics. That is, the spring is able to exert a greater force in response to a given deflection than a spring having the same dimensions and wire size with a trailing portion along the inside diameter of the spring.

As a result, these springs can be fabricated from smaller wire and have a closer coil spacing, while still exerting the same force in response to deflection as prior art springs.

The present invention is related to the discovery of other parameters which can be utilized to design garter-type springs having selected load-deflection characteristics, particularly when radially loaded.

First, it has been found that the turn angle, as hereinafter defined and discussed, can be utilized in the fabrication of garter-type radially loaded springs having higher load-deflection characteristics than heretofore fabricated springs utilizing the same wire diameters.

The advantages of higher loading have been hereinabove discussed.

In addition, the specific relationship and working resilient range of springs made in accordance with the present invention, can also be used to advantage and provide springs with tailored load-deflection characteristics which were not heretofore possible.

Second, it has been found that radial loading of the garter-type springs along the major axis thereof, as hereinafter discussed, with or without variation of the turn angle provides additional means for tailoring the load-deflection characteristics of the spring and causing such spring to cant along the major axis thereof radially from the inside or radially from the outside under an applied radial force.

It should be appreciated that in order for the spring to cant upon major axis radial loading, it needs to be contained in a cavity, or groove. It has been found that when the spring is in a free position and loaded along the major axis in a radial direction, it will resist canting or not cant at all.

In addition, the spring may be mounted, or contained, in a position wherein it will cant radially along the major axis and radially along the minor axis under application of both a radial and axial force.

It is important to recognize that while many parameters affecting the load-deflection characteristics of the garter-type springs, such as those hereinabove recited in connection with the discussion of the prior art, have little, or significantly different, effect on the resilient characteristics of the spring if the coils are not free to flex or bend in an uninhibited manner. For example, Bram discloses in U.S. Pat. No. 3,183,010 a reinforcement for a sealing element which takes the shape of a garter-type spring and, in fact, discloses a turn angle in that reinforcement element.

However, this disclosure of a reinforcement element, while in the shape of a spring, is not free to flex or be independently loaded, because it is imbedded in the body of a sealing element so as to be flush with the surface thereof. It is obvious that when so imbedded, this reinforcement element, or spring, is not free to flex or be independently loaded with the load-deflection characteristics that it would have in free space; that is, uninhibited deflection under load.

SUMMARY OF THE INVENTION

The canted-coil spring apparatus in accordance with the present invention generally includes a plurality of coils having a major and minor axis which are canted along a center line defined by an intersection of the major and minor axes. In addition, the coils are interconnected in a manner forming a garter-type canted coil spring.

Back angle means is provided for both defining the disposition of a trailing portion of each coil with respect to a line normal to the center line and for determining a radial load-deflection characteristic of the canted-coil spring assembly. Front angle means is provided for defining the disposition of a leading portion of each coil with respect to the normal line, with the front angle means being greater than the back angle means.

Also provided in accordance with the present invention are means for non-invasively supporting the plurality of coils in a preselected orientation suitable for radial loading of the garter-type canted coil spring and for controlling the radial resilient characteristics of the garter-type canted coil spring.

More particularly, the means for non-invasively supporting the garter-type resilient coil may include means, defining a groove, for deflecting the spring along the minor axis thereof and enabling the garter-type resilient coil spring to be radially loaded along the major axis thereof. Alternatively, the groove may provide means for deflecting the spring along the major axis thereof and enabling the garter-type resilient coil spring to be radially loaded along the major axis thereof.

In addition, the trailing portion may be disposed on an outside diameter of the garter-type resilient canted-coil spring and the leading portion disposed along an inside diameter of the garter-type resilient canted-coil spring. Alternatively, the trailing portion may be disposed along an inside diameter of the garter-type spring and the leading portion may be disposed along an outside diameter of the garter-type coil spring.

The back angle is selected to provide a radial load-deflection characteristic in which the load remains relatively constant within a working deflection and, further, the groove means may have a width at most equal to the coil height or in another embodiment in which the groove means may have a width greater than the coil height but less than the coil width.

BRIEF DESCRIPTION OF THE DRAWINGS

The advantages and features of the present invention will appear from the following description, when considered in conjunction with the accompanying drawings in which:

FIG. 1 is a canted coil spring in accordance with the present invention, with the coils being canted in a clockwise direction;

FIG. 2 is a view taken along line 2—2 of the spring in FIG. 1 showing a back angle on an inside diameter of the spring and a front angle on an outside diameter of the spring;

FIG. 3 is a spring in accordance with the present invention in which the coils are canted in a counter-clockwise direction about the center line thereof, with the back angle on the top thereof;

FIG. 4 is a view of the spring of FIG. 3 taken along the line 4—4 showing a back angle on an outside diameter of the spring and a front angle on an inside diameter of the spring;

FIG. 5 is a plane view of a radial spring in accordance with the present invention, which is canted in a clockwise direction about the centerline thereof, with the back angle on the top thereof;

FIG. 6 is a canted coil radial spring in accordance with the present invention in which the coils are canted in a counter-clockwise direction and the back angle is disposed on the bottom thereof;

FIGS. 10a, b and c show positions of radial springs when free (not loaded);

FIGS. 11a and b show the springs shown in FIGS. 10 a, b and c in a loaded position (along the minor axis) for piston and housing mounting;

FIGS. 12a, b and c show positions of radial springs when free (not loaded); and

FIGS. 13a and b show the springs shown in FIGS. 12a, b and c in a loaded position (along the major axis) for piston and housing mounting; and FIG. 14 is a cross-sectional view of a tapered groove which provides better spring retention.

DETAILED DESCRIPTION

Figure 9A:
FIGS. 9a, b, c and d and e illustrate axial and radial springs having various turn angles.

Continuing to FIGS. 1 through 6, there is shown a number of canted coil spring assemblies 10, 12, 14, 16, in accordance with the present invention, each including a plurality of coils 18, 20, 22, 24, respectively, canted along center lines 28, 30, 32, 34.

Springs 10, 12 have the coils 18, 20 interconnected in a manner forming a circular spring having primary load-deflection characteristics along an axial direction of the circular springs 10, 12. Spring 10 shown in FIG. 1, which has a clockwise canting of coils, has the coils 18 interconnected so that a back angle 38, which defines a trailing portion 40, is along an inside diameter 42 of the spring 10; and a front angle 46, which defines a leading portion 48 of the coil 18, is along an outside diameter 50 the spring 10. See FIG. 2.

Turning to FIGS. 3 and 4, the axial spring 12 therein has the coils 20 interconnected in a fashion having a counter-clockwise canting of coils with a back angle 54, defining a trailing portion 56, along inside diameter 58 of the spring 12 and a front angle 60, defining a leading portion 62, along an outside diameter 64 of the spring 12.

Turning now to FIGS. 5 and 6, there is shown springs 14, 16 having a plurality of coils 20, 24 which are interconnected in a manner forming a circular spring having a primary load-deflection characteristic along a radial direction indicated by the arrows 66, 68. As shown in FIG. 5, the coils are interconnected in a manner for providing a clockwise canting with back angle 72 defining a trailing portion 74 along a top 76 and a front angle 78 defining a leading portion 80 which is disposed along a bottom 82 of the spring 14.

Alternatively, as shown in FIG. 6, the spring 16 may have coils 24 interconnected in a manner causing canting of the coils in a counter-clockwise direction with a back angle 88 defining a trailing portion 90 along a bottom 92 of the spring 16 and a front angle 96 defining a leading portion 98 disposed along a top 100 of the spring 16.

As hereinafter described, all of the springs 10, 12, 14, 16 may have a generally constant force-deflection characteristic within a working deflection thereof.

Figure 7:
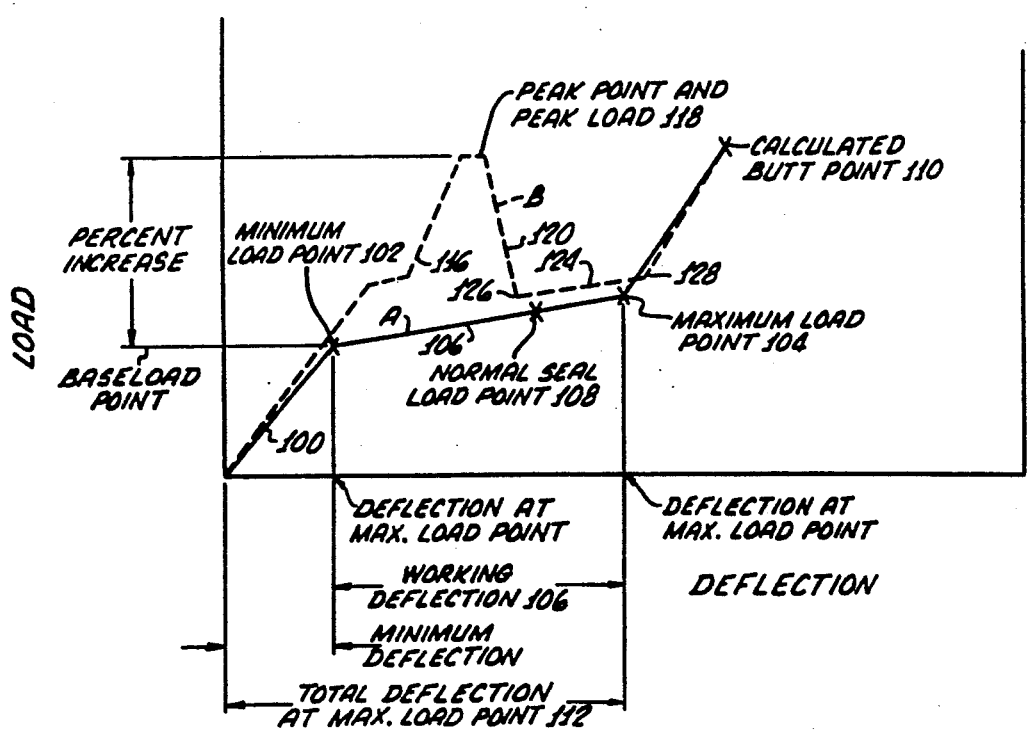
FIG. 7 shows load-deflection curves for springs assembled in accordance with the present invention.

In FIG. 7 there are shown load-deflection curves A and B for the purpose of illustrating the characteristics of the canted coil garter-type resilient coil springs.

As shown by curve A when a load is applied to an annular spring, the spring deflects in a general linear fashion as shown by the line segment 100 until it reaches minimum load point 102 which represents the point at which, after initial deflection, the load begins to remain relatively constant.

Between the minimum load point 102 and a maximum load point 104, the load-deflection curve may be constant or show a slight increase, as shown in FIG. 7. The area between the minimum load point 102 and the maximum load point 104 is known as the working deflection range 106. The spring is normally loaded for operation within this range; as indicated by point 103 for a typical spring utilized in conjunction with seal, gasket, or the like, for sealing purposes.

Loading of the spring beyond the maximum load point 104 results in abrupt deflection response until it reaches a butt point 110, which results in a permanent set in the spring as a result of overloading. Also indicated in FIG. 7 is the total deflection range 112 which is defined as the deflection between the unloaded spring and the deflection at the maximum load point 104.

Also shown in FIG. 7 is a load-deflection curve B showing the characteristics of the spring 10, 12, 14, 16 made in accordance with the present invention, showing a linear load-deflection segment 116 until a peak load point 118 is reached. After the peak point 38, the load decreases with deflection in segment 120. This results in a saddle-type deflection range between the peak point 118 and the butt point 110.

This type of load-deflection characteristic may have specific advantage for spring seals which are locked in position, such as a groove, with the tension thereof being caused by the spring. In this instance, while the spring produces a relatively constant load over a given working deflection range 124, changes beyond the working range limits at points 126, 128 cause an abrupt increase in load. This causes the spring seal to be self-centering within a groove, or the like.

Other applications in which the spring of the present invention may be used to advantage include static applications where a heavy load is desired with no increase in wire diameter of spacing of coils. Still another application is where a heavy initial load is desired such as in seals subjected to cryovac temperature and the like.

Figure 8:
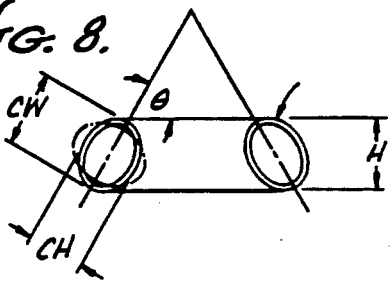
FIG. 8 is a schematic of an axially canted coil spring with turn angle $\theta$ shown for the purpose of illustrating how the turn angle $\theta$ may be calculated.

FIG. 8 shows, in schematic form, a cross-section of a canted coil spring 10, 12, 14, 16 in accordance with the present invention, with a free axial turn angle $\theta$, a measured coil width, CW, a measured coil height, CH, and a measured spring height H. In FIG. 8, the free turn angle $\theta$ may be clockwise (bold lines) or counterclockwise (dashed lines).

Figure 9B:
Figure 9C:
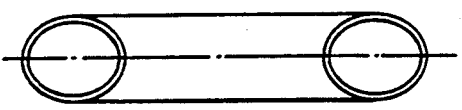
Figure 9D:
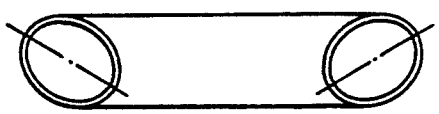
Figure 9E:
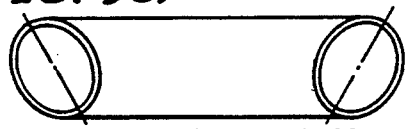

As shown in FIG. 9c, an axially flat spring may be turned up counterclockwise, for example, 30 degrees, as shown in FIG. 9b, and 90 degrees as shown in FIG. 9a, or turned clockwise as, for example, shown in FIGS. 9d and 9e, with 30 degree and 60 degree turn angles, respectively. It should be appreciated that while the springs are shown with an elliptical shape, other shapes are possible, such as circular or rectangular, depending upon the configuration of the mating parts between which the spring 10, 12, 14, 16 is to be placed.

As shown in FIG. 8, the free axial turn angle $\theta$ is defined as an angle formed by a generally circular spring forming a cone or an inverted cone, depending on the position of the spring and measuring the angle $\theta$ from the horizontal to the intersection through the center line of each cone, or inverted cone. By varying the turn angle $\theta$, different loads can be obtained and the degree of loading depends upon the turn angle $\theta$. That is, the higher the turn angle $\theta$, the higher the force developed, as will be hereinafter demonstrated. It should be noted that the force developed upon loading is independent whether the spring is in the cone shape, as shown in FIG. 9b, or an inverted cone, as shown in FIG. 9e. That is, the springs in 9b and 9e will perform in identical fashion.

Now to FIGS. 10a, 110b, and 10c, there is shown positions for springs 200 202 204 in a free, or unloaded, state but suitable for radial loading. As shown, springs 200 and 202 have an axial turn angle $\alpha$ of 60° with the spring 200 shown in FIG. 10a being an inverted cone-type and the spring 202 shown in FIG. 10b being of a cone type. It should be appreciated that the axial turn angle referred to throughout this specification is taken in context with rotation of the spring, for example, spring 200 about a center line 206 with the turn angle $\alpha$ measured from the radius 208, $\alpha$ being, for example, about 60° as shown in FIGS. 10a and 10b. FIG. 10c shows a radial spring having an axial turn angle approximately 90° with a coil height, CH, measured along a minor axis 210 and a coil width, CW, measured along a major axis 212.

FIG. 11a shows the spring 200 disposed within a groove 214 having a groove width greater than the coil height, CH, and a groove height, GH, less than the coil width, CW. This provides for a load turn angle $\theta$ of about 35°. The radial groove 214 positions the spring 200 for a radial loading against a piston, or shaft 224, which results in a deflection 226 of the spring 200. In this example, spring 200 is shown in a preferred position, i.e., in an inverted cone position using a minimum amount of force. Alternatively, the spring 200 could also be assembled in a cone-type position, as shown in FIG. 12a, which would develop substantial higher force.

As alternatively shown in FIG. 11b, the spring may be mounted in a radial groove 230 disposed in a shaft, or piston, 232 loading the spring in a similar manner against a housing 234.

In another embodiment of the present invention, springs 240 242 244 shown in FIGS. 12a, 12b and 12c are similar to those heretofore described in connection with springs 200 202 204, except that turn angle $\alpha$ is approximately 80° for springs 240 and 242, as shown in FIGS. 12a and 12b. Spring 242 may be disposed in a radial groove 250 and housing 252 for radial loading by a piston, or shaft, 254. In this instance, the groove width, GW, is less than the coil width, CW, and the groove height, GH, is less than the coil height, CH. The load turn angle $\theta$ is about 5°, and the loading occurs generally along the minor axis 260 of the spring 242. This is to be contrasted with the generally major axis 212 loading of the spring 200 as shown in FIG. 11a.

In connection with spring 242 as shown in FIG. 13a, upon assembly of the spring 242 into the radial groove 250, spring 242 will be turned along the major axis of the coil, and in this instance, its turn angle will be relatively small so as to retain the spring 242 in the radial groove 250. In this instance, as shown in FIGS. 12a and 12b, the turn angle $\alpha$ is about 80° but can be between 80° and 90°. An $\alpha$ turn angle smaller than 80° will make it more difficult to retain the spring 242 into the radial groove 250.

Alternatively, as shown in FIG. 13b, spring 242 is disposed in a radial groove 270 in a piston, or shaft, 272 for deflection by housing 274. In this instance, the assembly turn angle is about 5° and the groove width, GW, is less than the coil width, CW, and the groove height, GH, is less than the coil height, CH.

While the radial grooves 214, 232, 250 and 270 are shown in a generally rectilinear shape, it is appreciated that a groove 280, as shown in FIG. 145, may have a tapered configuration, or a negative angle $\beta$, to improve spring retention therein. In this instance, the radial groove 280 has a width 282 at a bottom 284 thereof greater than wa width 286 at an opening 288 thereof through which the spring (not shown in FIG. 14) is inserted for loading by a shaft 290.

Although there has been described hereinabove specific spring assemblies in accordance with the present invention for the purpose of illustrating the manner in which the invention may be used to advantage, it should be appreciated that the invention is not limited thereto. Accordingly, any and all modifications, variations, or equivalent arrangements which may occur to those skilled in the art should be considered to be within the scope of the invention as defined in the appended claims.

What is claimed is:

1. Canted coil spring assembly comprising:
   a plurality of coils, each having a major and a minor axis and canted along a center line defined by an intersection of the major and minor axes, said coils being interconnected in a manner forming a radial garter-type canted coil spring;
   back angle means for both defining the disposition of a trailing portion of each coil with respect to a line normal to the center line and for determining a radial load-deflection characteristic of the canted coil spring assembly;
   front angle means for defining the disposition of a leading portion of each coil with respect to the normal line, said front angle means being greater than said back angle means; and
   groove means for non-invasively supporting the plurality of coils with interference between the coils and the groove means and in an orientation suitable for radial loading of the radial garter-type canted coil spring in order to control the resilient characteristics of the radial garter-type canted coil spring.

2. The canted coil spring assembly according to claim 1 wherein said means for non-invasively supporting the radial garter-type canted coil spring includes means, defining a radial groove, for deflecting the coils along the minor axis thereof to enable said radial garter-type canted coil spring to be radially loaded along the major axis of the coils.

3. The canted coil spring assembly according to claim 1 wherein said means for non-invasively supporting the radial garter-type canted coil spring includes means, defining a radial groove, for deflecting the coils along a major axis thereof to enable said radial garter-type canted coil spring to be radially loaded along the major axis of the coils.

4. The canted coil spring assembly according to claim 1 wherein said means for non-invasively supporting the radial garter-type canted coil spring includes means, defining a radial groove, for supporting and orienting said radial garter-type canted coil spring with a turn angel of greater than zero degrees (0°) and less than ninety degrees (90°).

5. The canted coil spring assembly according to claim 2 wherein said radial garter-type canted coil spring has an axial assembly turn angle of between about 45° and about 90°, requiring turning of the spring between about 45° and about 90° in order to assemble the spring into the radial groove.

6. The canted coil spring assembly according to claim 2 wherein said radial garter-type canted coil spring has an axial assembly turn angle of about 90°, requiring turning of the spring of about 90° in order to assemble the spring into the radial groove.

7. The canted coil spring assembly according to claim 6 wherein said radial groove has a width smaller than a width of the coils.

8. The canted coil spring assembly according to claim 6 wherein said radial groove has a depth smaller than a width of the coils.

9. The canted coil spring assembly according to claim 7 wherein the radial groove has a width greater than a height of the coils.

10. Canted coil spring assembly comprising:
    a plurality of coils each having a major and a minor axis and canted along a center lien defined by an intersection of the major and minor axes, said coils being interconnected in a manner forming a radial garter-type canted coil spring;
    back angle means for both defining the disposition of a trailing portion of each coil with respect to a line normal to the center line and for determining a radial load-deflection characteristic of the canted coil spring assembly;
    front angle means for defining the disposition of a leading portion of each coil with respect to the normal line, said front angle means being greater than said back angle means; and
    means for non-invasively supporting the plurality of coils in an orientation suitable for radial loading of the radial garter-type canted coil spring and for controlling the resilient characteristics of the radial garter-type canted coil spring, said means for non-invasively supporting the radial garter-type canted coil spring including means, defining a radial groove, for deflecting the coils along the minor axis thereof to enable said radial garter-type canted coil spring to be radially loaded along the major axis of the coils, said radial groove having a width at a bottom thereof greater than a width at an opening thereof through which the spring is inserted.

* * * * *